W. GOLDIE.

REINFORCING MEANS FOR CONCRETE STRUCTURES.

APPLICATION FILED MAR. 30, 1920.

Reissued Aug. 31, 1920. 14,941.

2 SHEETS—SHEET 1.

INVENTOR

William Goldie

By Kay & Totten,

Attorneys

W. GOLDIE.

REINFORCING MEANS FOR CONCRETE STRUCTURES.

APPLICATION FILED MAR. 30, 1920.

Reissued Aug. 31, 1920. 14,941.

2 SHEETS—SHEET 2.

INVENTOR

William Goldie

By Kay & Totten,

Attorneys

UNITED STATES PATENT OFFICE.

WILLIAM GOLDIE, OF WILKINSBURG, PENNSYLVANIA.

REINFORCING MEANS FOR CONCRETE STRUCTURES.

14,941. Specification of Reissued Letters Patent. Reissued Aug. 31, 1920.

Original No. 1,312,908, dated August 12, 1919, Serial No. 244,236, filed July 10, 1918. Application for reissue filed March 30, 1920. Serial No. 370,037.

*To all whom it may concern:*

Be it known that I, WILLIAM GOLDIE, a citizen of the United States, and a resident of Wilkinsburg, in the county of Allegheny and State of Pennsylvania, have invented a new and useful Improvement in Reinforcing Means for Concrete Structures; and I do hereby declare the following to be a full, clear, and exact description thereof.

My invention relates to reinforcing means for concrete structures particularly for concrete walls, floors and for the bottom and sides of a vessel.

One of the great defects of the present methods and structures for reinforcing concrete consists in the fact that the several intersecting reinforcing members are either not bound together at all, or are loosely bound by wire and the like, whereby in so far as the character of the junctions of these intersecting members is concerned, they may have relative play or movement one with respect to the other. I have found in practice that where the intersecting reinforcing members for concrete have such relative play or movement, and where consequently said members are only held in the same relative position by reason of the concrete surrounding them, there is a strong tendency for the members of the reinforcing structure to break loose from the surrounding concrete and thus weaken the entire structure.

The purpose of my invention, therefore, is to provide in a reinforcing structure for concrete means for effectively and rigidly holding the intersecting members of such structure together so that there can be no relative play one with respect to the other. A further object of my invention is to very considerably lighten the weight of the concrete reinforcing structure without detracting in any way from the strength of such structure. Finally, it is a further object of the invention to so construct the reinforcing members themselves and the means of uniting them together that said members may be cut to length before they are brought to the place of assembly and may be assembled economically and quickly by unskilled labor.

Figure 1:
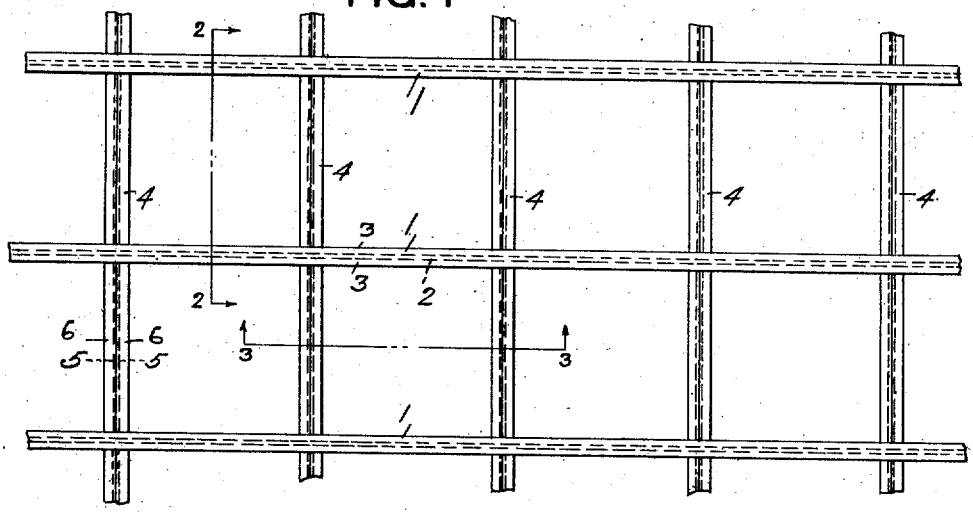
Figure 2:
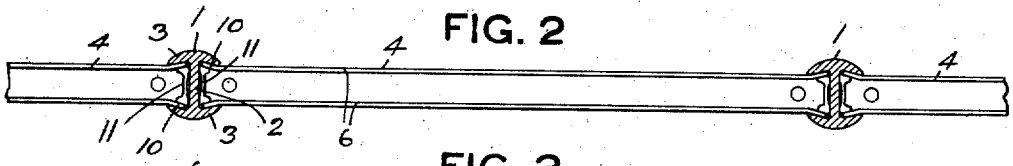
Figure 3:
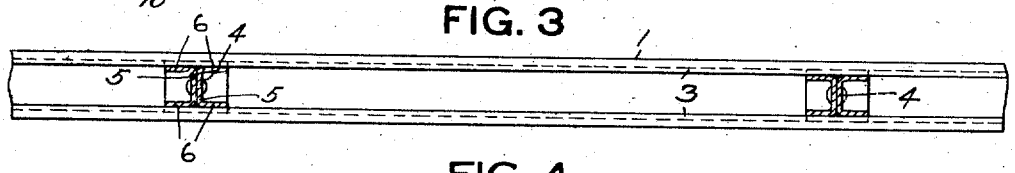
Figure 4:
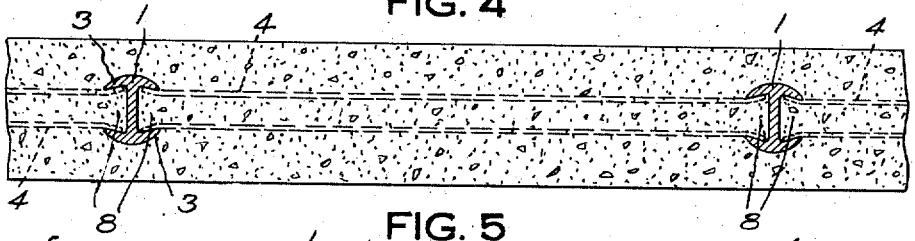
Figure 5:
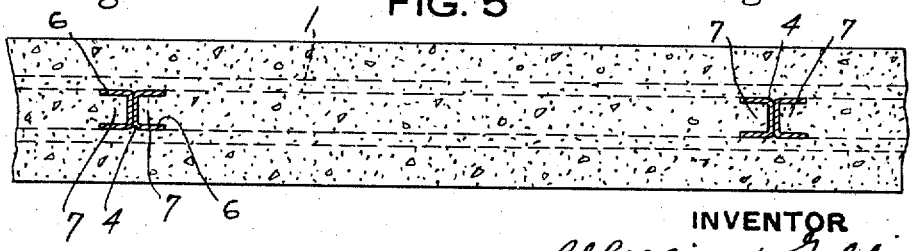
Figure 6:
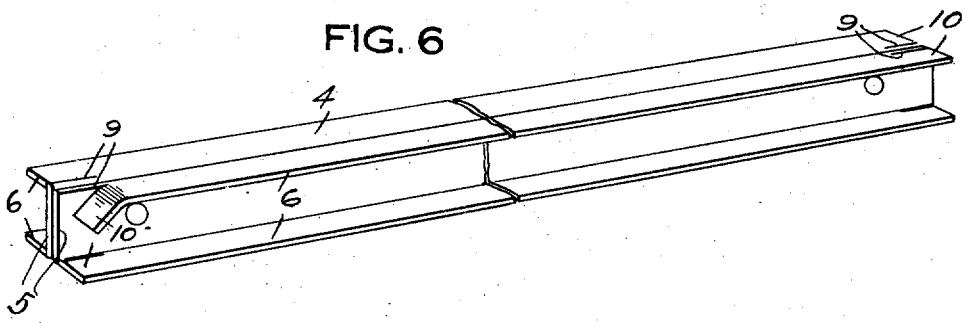
Figure 11:
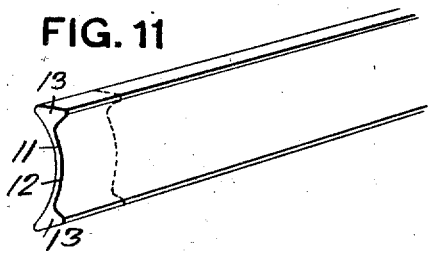
Figure 12:
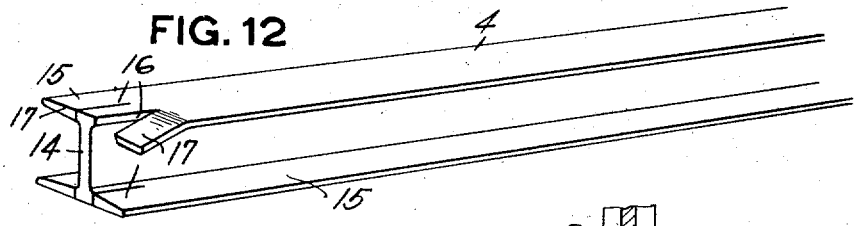
Figure 13:
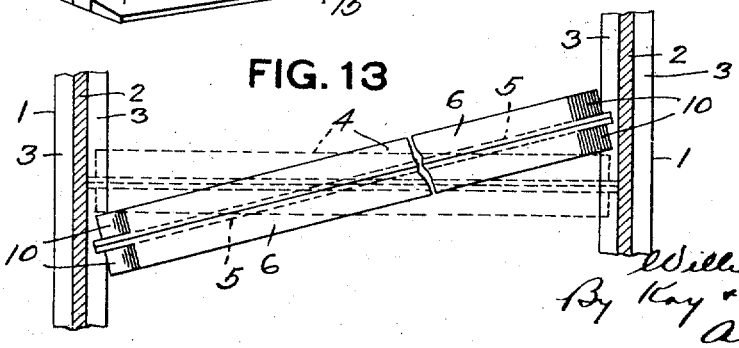

With these and other objects in view, as will appear from the following description, the invention consists in a construction and arrangement of parts preferred embodiments of whch are illustrated in the accompanying drawings in which Figure 1 is a fragmentary plan view of a section of my improved reinforcing structure. Fig. 2 is a transverse sectional view taken on the line 2—2, Fig. 1; Fig. 3 is a transverse sectional view taken on the line 3—3, Fig. 1; Figs. 4 and 5 illustrate the sections of the structures shown in Figs. 2 and 3, embedded in the concrete. Fig. 6 is a perspective view of one of the transverse or auxiliary reinforcing members; Figs. 7 to 10, inclusive, show the successive steps in rigidly connecting the auxiliary transverse members to the main frame members; Fig. 11 is a perspective view of a rolled section from which the fastening plates for uniting the frame members may be cut indicating also a section cut from said rolled section; Fig. 12 is a view similar to Fig. 6 of a modified form of auxiliary reinforcing member, and Fig. 13 is a plan view showing the manner of inserting the transverse members in the main frame members.

In the embodiment of my invention herein selected for illustration and referring first to Fig. 1, 1 indicates what may be termed the main reinforcing frame members. These members, as shown in cross section by Figs. 1 to 4, and 7 to 10, inclusive, consist preferably of wrought or rolled sections of metal, each having a web 2 which is to be positioned parallel to the direction of the lines of bending strain on the concrete structure, and these main frame members have at the top and bottom of the web 2 the laterally extending flanges 3, which, as here shown, are contracted or approach each other at their outer edges forming in effect longitudinal dove-tailed recesses or grooves along each side of these main frame members. The outer surfaces of these main frame members, including the flanges 3, may be substantially circular in cross section, as illustrated, which form adds to the bending strength of the members, and also facilitates the rolling of the section thereof. Any suitable form of transverse members may be employed extending between the main frame members and connected therewith. The transverse frame members 4, as shown, in Fig. 1, and also as shown in side view, Fig. 2, and in cross section, Fig. 3, may consist of a pair of channel members. One of these auxiliary or transverse reinforcing members, is clearly shown in perspective in Fig. 6, in which the reinforcing member as a whole is shown to consist of a pair of channel members placed back to back and riveted together. Each channel member comprises a bottom web 5 and lateral flanges 6. When these transverse members are placed in position within the reinforcing structure, the webs 5 extend parallel with the lines of strain on the concrete structure and the flanges 6 extend transversely of said lines of strain. Consequently, it will be obvious that all bending strains on the concrete structure within which these transverse members are embedded will be effectively resisted by the longitudinal solid ribs 7 of concrete, Fig. 5, between the upper and lower flanges 6 of the channel-shaped members, and these concrete ribs 7 are in turn reinforced by the flanges 6. It will likewise be obvious that the dove-tailed longitudinal recesses formed by the upper and lower flanges 3 of the main frame members, see Fig. 4, will form solid concrete ribs 8 along the sides of the main frame members, which concrete ribs will powerfully reinforce the cross sections of the main frame members against bending strains, and which concrete ribs will be in turn greatly reinforced and strengthened by the flanges 3 themselves of the main frame members. It will be clear, therefore, that in reinforced concrete structures so formed and with the longitudinal grooves both of the main frame members and the transverse frame members extending laterally or transversely of the lines of strain on the concrete structure as a whole, the concrete of the structure will be powerfully reinforced by the reinforcing members and the reinforcing members themselves will be powerfully reinforced by the solid concrete ribs lying within these longitudinal recesses.

In order to secure the transverse reinforcing members rigidly to the main frame members, the height of these transverse members is such that the ends thereof will fit readily between the flanges 3 of the main reinforcing members and when so fitted and after the transverse members have been brought to a position at right angles to the main frame members, the flanges 6 of the transverse members may be expanded into close engagement with the contracted or approaching flanges of the main frame members. This is accomplished in the following manner: The flanges 6 may be cut back as at 9 adjacent the ends of the transverse member. Then the cut portion 10 at the ends of these flanges may be bent toward each other, as illustrated in Fig. 6, and also in Fig. 7. With the ends of the flanges so bent toward each other obviously the transverse members may be the more readily brought to the right angular position with respect to the main frame members 4. It will be necessary in inserting the ends of the transverse members into the opposite side grooves of the main frame members that the transverse members must be placed in such position on a slant in diagonal and must then be forced to right angled position with respect to the main frame members.

If, now, the flanges 6 of the transverse members extend to the full length of said members, the corners of these flanges will engage the vertical webs 2 of the main frame members, and will tend to prevent the swinging or shifting of the transverse members to right angled position. With the ends of the flanges 6 bent inwardly, as shown in Figs. 6 and 7, it is obvious that the longitudinal distance between the ends of these flanges 6 will be reduced, and consequently they will clear the vertical webs 2 of the main frame members when the transverse members are first placed between the main frame members to be shifted or swung to right angled position, all as clearly illustrated in Fig. 13.

Figure 7:
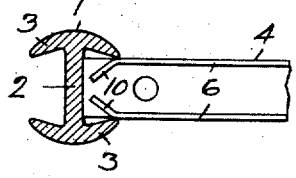
Figure 8:
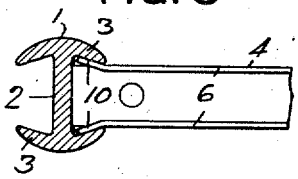
Figure 9:
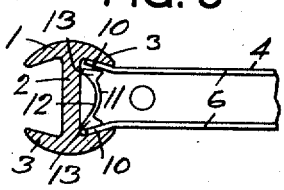
Figure 10:
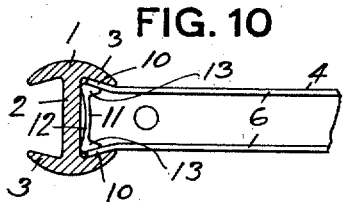

When the transverse members are brought to such right-angular position, with respect to the main frame members, the bent ends 10 of the flanges 6, as shown in Fig. 7, will lie in the position shown in said figure. In order now rigidly to unite the transverse members to the main frame members, it is necessary to expand these flange ends 10 into rigid and intimate engagement with the inner sides of the opposite flanges 3 of the main frame members. To do this, the bent ends 10 of these flanges may first be spread apart and into engagement with the flanges 3 of the main frame members as in Fig. 8, by means of any suitable instrument. But in order to engage these flange ends 10 rigidly with the flanges 3 of the main frame members, it is necessary to expand them powerfully against said main flanges. To this end, I have provided an expander member, such for example, as the plate 11 in Fig. 9. This plate is again illustrated in perspective and sectional view in Fig. 11, where it is shown as cut from a rolled or wrought section of steel. Each of these expander plates, when completed, consists of a curved body portion 12 and the enlarged wedge-shaped heads 13. When first formed these expander members are of a length to fit easily between the flanges 6 of the transverse members before said flanges are expanded fully against the flanges 3. This condition of the expander and its position between flanges 6 is illustrated in Fig. 9. In order to expand the ends 10 of the flanges 6 into rigid engagement with the flanges 3 of the main frame members, the expander 11 may be flattened out by blows upon the curved body portion 12, thus forcing the wedge-shaped heads 13 of said expander member apart, as shown in Fig. 9, and forcing the ends 10 of the flanges 6 into intimate and rigid engagement with the flanges 3 of the main frame members. From this structure it will be seen that the transverse members are rigidly and securely held against any longitudinal movement between the main frame members and necessarily against any sliding movement on said members, because the wedging action of the expanders 11 forces the ends of the flanges 6 into a most rigid and tight engagement with the flanges 3.

In the transverse member thus far described, it will be noted that the same is described as made up of two separate channel members riveted together back to back. This manner of constructing the transverse members is for the purpose of economy, since such channel members may be readily rolled from sheet metal of comparatively thin gage and yet when these two channel members are so secured together, they form very rigid structure of reinforcing member.

By placing the channel members back to back, as shown in Fig. 5, and securing them together, it will be seen that the transverse reinforcing member presents laterally extending channels on either side for the forming of solid concrete ribs therein which mutually strengthen each other as heretofore described.

In the modified form of transverse member illustrated in Fig. 12, it is shown as formed of a single rolled section having the vertical web 14 and the lateral flanges 15. Such section, however, is somewhat more expensive to roll than the form illustrated in Fig. 6, and it is impossible to make such a rolled section of the reduced weight of the other form. However, in using the transverse section shown in Fig. 12, the flanges 15 may be cut back from the web, as shown at 16, and the cut back portion 17 may be bent inwardly as in the case of the cut back portion 10 of the flanges 6 in the form shown in Fig. 6, for the purpose of facilitating insertion and positioning of the transverse section between the main frame section. The assembling of this modified form of transverse section with the main frame members is the same as that herein described for the form of transverse section shown in Fig. 6.

While I have herein shown and described a particular embodiment of my invention, it is to be understood that the invention may be altered in details of construction and arrangement of parts within the scope of the appended claims.

What I claim is:

1. A reinforcing structure for concrete, comprising main frame members having recesses extending along the sides thereof, metallic connecting members for entering the side recesses of said bars and having movable portions adapted to be forced into holding engagement with the said frame members within the said recesses, and locking members for forcing the said movable portions of the said connecting members into said holding engagement in said recesses.

2. A reinforcing structure for concrete comprising main frame members having dove-tailed recesses extending along the sides thereof, metallic connecting members for entering said side recesses and having movable portions adapted to be forced into holding engagement with the said frame members within the said recesses, and other members for forcing the said movable portions of the said connecting members into said holding engagement in the recesses of the bars.

3. A reinforcing structure for concrete comprising main frame members having dove-tailed recesses extending along the sides thereof, metallic connecting members provided with expansible end portions adapted to enter said side recesses and expanders adapted to enter said side recesses and to expand the said end portions within the same and hold the connecting members therein.

4. A reinforcing structure for concrete comprising main frame members having dove-tailed recesses extending along the sides thereof, metallic connecting members provided with expansible end portions adapted to enter said side recesses, and expander members adapted to be placed in said dove-tailed recesses of the main frame bars and having bent body portions adapted to be expanded and force the said expansible end portions of the connecting members against the walls of said recesses.

5. A reinforcing structure for concrete comprising a bar having dove-tailed side recesses, metallic connecting members provided with expansible end portions adapted to enter said dove-tailed recesses and metallic expander members having curved bodies adapted to be expanded within the recesses of the bars and to expand the said end portions, thereby locking the transverse members in said dove-tailed recesses.

6. A reinforcing structure for concrete, comprising a main reinforcing bar having dove-tailed recesses extending along the sides thereof, of a transverse reinforcing bar having a vertical web and having flanges adapted to be expanded into and engage the dove-tailed walls of said recesses, and means for expanding the flanges in the dove-tailed recesses.

7. A reinforcing structure for concrete comprising a main reinforcing bar having a dove-tailed recess extending along the side thereof, of a transverse reinforcing bar having a vertical web, and having flanges adapted to be expanded into and engage with the walls of said recess, an expander adapted to be placed between the ends of said flanges within and be expanded to expand and hold said flanges in rigid engagement with the dove-tailed walls of said recess.

8. A reinforcing structure for concrete comprising a main reinforcing bar having a dove-tailed recess extending along the side thereof, metallic connecting members entering said recesses and expander members adapted to be placed in said recesses and expanded to hold said connecting members in rigid engagement with the dove-tailed walls of said recess, said expander members having comparatively thin webs and enlarged heads at each end thereof, said webs when flanged out being adapted to force said heads firmly into engagement with the metallic connecting members to hold the same in rigid engagement with the main frame bar.

9. A reinforcing structure for concrete comprising a main reinforcing bar having a vertical web and having flanges extending laterally from the top and bottom of said web to form dove-tailed recesses along the sides of said bar, a transverse reinforcing bar comprising a web and flanges extending laterally from said web, the ends of said flanges being cut away from said web and bent inwardly to facilitate the insertion of the ends of the transverse bars within the dove-tailed recesses.

10. A reinforcing structure for concrete comprising main frame bars having dove-tailed recesses, metallic connecting members having end portions adapted to be expanded within the dove-tailed recesses and expander members having curved central web portions adapted to be expanded within the transverse connecting members and expand the transverse members into a rigid engagement with the walls of the recesses of the main frame bars.

WILLIAM GOLDIE.

Witnesses:
BESS G. GUNDARAÈS,
JEAN HUNTER.